United States Patent
Lee et al.

(10) Patent No.: US 8,977,409 B2
(45) Date of Patent: Mar. 10, 2015

(54) APPARATUS AND METHOD FOR UNMANNED SURVEILLANCE, AND ROBOT CONTROL DEVICE FOR UNMANNED SURVEILLANCE

(71) Applicant: Electronics and Telecommunications Research Institute, Daejeon (KR)

(72) Inventors: Chang Eun Lee, Daejeon (KR); Hyun Kyu Cho, Daejeon (KR); Sung Hoon Kim, Daejeon (KR); Beom-Su Seo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 13/706,402

(22) Filed: Dec. 6, 2012

(65) Prior Publication Data
US 2013/0197718 A1 Aug. 1, 2013

(30) Foreign Application Priority Data
Jan. 30, 2012 (KR) ........................ 10-2012-0009117

(51) Int. Cl.
G05D 1/00 (2006.01)
(52) U.S. Cl.
CPC ............ *G05D 1/0011* (2013.01); *G05D 1/0088* (2013.01); *G05D 1/0038* (2013.01); *Y10S 901/01* (2013.01); *G05D 2201/0209* (2013.01)
USPC ..................... 701/2; 701/23; 701/28; 901/1
(58) Field of Classification Search
USPC .................. 701/2, 23–28, 439, 207; 180/167; 901/1; 348/113, 114; 700/245, 249, 700/257
See application file for complete search history.

(56) References Cited

U.S. PATENT DOCUMENTS

| | | | | |
|---|---|---|---|---|
| 5,999,865 A | * | 12/1999 | Bloomquist et al. | 701/25 |
| 6,439,162 B1 | * | 8/2002 | van den Berg | 119/174 |
| 7,139,642 B2 | * | 11/2006 | Kamoto et al. | 700/248 |
| 8,401,275 B2 | * | 3/2013 | Wang et al. | 382/153 |
| 2002/0095239 A1 | * | 7/2002 | Wallach et al. | 700/245 |
| 2004/0010344 A1 | * | 1/2004 | Hiratsuka et al. | 700/245 |
| 2007/0021879 A1 | * | 1/2007 | DelNero et al. | 701/23 |
| 2009/0125175 A1 | * | 5/2009 | Park et al. | 701/28 |
| 2011/0135189 A1 | | 6/2011 | Lee | |

(Continued)

FOREIGN PATENT DOCUMENTS

| | | | |
|---|---|---|---|
| CN | 101391147 A | * | 3/2009 |
| CN | 102819262 A | * | 12/2012 |

(Continued)

*Primary Examiner* — Mary Cheung
*Assistant Examiner* — Rodney Butler
(74) *Attorney, Agent, or Firm* — Rabin & Berdo, P.C.

(57) ABSTRACT

An unmanned surveillance device includes a robot control terminal configured to be loaded within a remote control robot under a surveillance environment, collect state information and surrounding circumstance information, operate the remote control robot in driving mode or surveillance mode according to a remote control command corresponding to the state information and surrounding circumstance information. Further, the unmanned surveillance device includes a remote control system configured to receive the state information and the surrounding circumstance information of the remote control robot from the robot control terminal, output the received state information and surrounding circumstance information of the remote control robot, and provide the remote control command to the robot control terminal.

13 Claims, 16 Drawing Sheets

(56) References Cited

U.S. PATENT DOCUMENTS

2012/0083923 A1* 4/2012 Matsumoto et al. .......... 700/255
2012/0197439 A1* 8/2012 Wang et al. .................. 700/259
2013/0230099 A1* 9/2013 DeForest et al. ......... 375/240.08

FOREIGN PATENT DOCUMENTS

| KR | 10-2006-0071646 A | 6/2006 |
| KR | 10-2011-0064861 A | 6/2011 |
| WO | WO 2011141629 A1 * | 11/2011 |

* cited by examiner

WALL
PATTERN #1

WALL
PATTERN #2

WALL
PATTERN #3

WALL
ATYPICAL
SURVEILLANCE

APPARATUS AND METHOD FOR UNMANNED SURVEILLANCE, AND ROBOT CONTROL DEVICE FOR UNMANNED SURVEILLANCE

CROSS-REFERENCE TO RELATED APPLICATION(S)

The present invention claims priority of Korean Patent Application No. 10-2012-0009117, filed on Jan. 30, 2012, which is incorporated herein by reference.

FIELD OF THE INVENTION

The present invention relates to unmanned surveillance technology using a remote control system; and more particularly, to an apparatus and a method for unmanned surveillance, and a robot control device for the unmanned surveillance, which is suitable for monitoring various states in surveillance environments by using a mobile unmanned patrol robot and a remote control system in environment such as a prison which surveillance is required.

BACKGROUND OF THE INVENTION

FIG. 1 shows an unmanned surveillance and strike control system using wired and wireless transmission device in the related art.

As shown in FIG. 1, the unmanned surveillance and strike control system manages and controls a series of processes from first surveillance to action in a situation by centrally controlling a function of VMD (Video Motion Detection) and a CCU (Central Control Unit) by a DVR (Digital Video Recorder), observing in wide-area and improving the capability of real-time surveillance in external intrusions through detecting, finding position, and tracking moving objects, and sharing an surveillance area by wired and wireless transmission devices.

This conventional technology may understand the situation of the surveillance area through a surveillance equipment in a remote control room, but there is a problem in that an operator in the remote control room needs to manually perform simultaneous and multiple-surveillance on numerous surveillance equipments.

SUMMARY OF THE INVENTION

In view of the above, the present invention provides unmanned surveillance technology capable of preventing or early detecting correctional accidents such as suicide, assault, arson, vandalism, and the like by multi-monitoring various states in surveillance environments by using a mobile unmanned patrol robot and a remote control system in environment such as a prison which surveillance is required.

In accordance with a first aspect of the present invention, there is provided an unmanned surveillance device.

Here, the surveillance device includes a robot control terminal configured to be loaded within a remote control robot under a surveillance environment, collect state information and surrounding circumstance information, operate the remote control robot in driving mode or surveillance mode according to a remote control command corresponding to the state information and surrounding circumstance information; and a remote control system configured to receive the state information and the surrounding circumstance information of the remote control robot from the robot control terminal, output the received state information and surrounding circumstance information of the remote control robot, and provide the remote control command to the robot control terminal.

Here, the driving mode may include one of standby mode, semi-autonomous driving mode, autonomous driving mode, return mode, manual control mode, or emergency stop mode.

In accordance with a second aspect of the present invention, there is provided a robot control terminal for unmanned surveillance. The robot control terminal includes a robot state information processor unit configured to perform a function of creating space infrastructure for driving of a robot, and collect and process the state information of the robot; a robot autonomous driving unit configured to provide location awareness information for autonomous driving of the robot according to a result of processing the state information processed by the robot state information processing unit, provide an optimal path for the autonomous driving of the robot; a remote control command processor unit configured to process surveillance information for remote control of the robot while being connected with the robot autonomous driving unit, process behavior control of the robot based on the remote control; and a user mission performance support unit configured to process image information for the remote control of a user while being connected to the remote control command processor unit, transmit situation awareness sensor information to an operation system.

Here, the robot autonomous driving unit may provide a function of reasoning and searching for the autonomous driving of the robot.

Further, the robot autonomous driving unit may provide a function of modeling and awareness of an environment.

Further, the robot control terminal may include a function of image-based context awareness.

In accordance with a third aspect of the present invention, there is provided a method for unmanned surveillance using a remote control system. The method includes a robot control terminal loaded in a robot under unmanned surveillance environment tracking an adaptive object based on a human context; the robot control terminal detecting an object based on fusion of features after tracking the adaptive object; controlling a three-dimensional camera for extracting geometric object information after detecting the object based on the fusion of the features; analyzing and perceiving an abnormal situation context according to the result of the controlling the three-dimensional camera; and alarming and monitoring an abnormal situation according to the result of analyzing and perceiving the situation context.

Here, said tracking an adaptive object may include tracking the object based on complex features; and modeling backgrounds based on entropy for changing a background such as lighting.

Further, said detecting the object based on fusion of features may include modeling and matching based on the complex features; and performing segmentation based on adaptive morphology.

Further, said controlling a three-dimensional camera may include managing a three-dimensional multi-object profile; and extracting three-dimensional feature for extracting geometric information.

Further, said analyzing and perceiving a situation context may include fusing and analyzing multiple objects feature information and a statistics-based prediction model for dynamic emergency events modeling; and perceiving abnormal behavior context.

Further, the complex features may include at least one of correction filter, color, context and edge.

In accordance with the present invention, correctional accidents such as suicide, assault, arson, vandalism, and the like may be prevented or early detected by multi-monitoring various states in surveillance environments by using a mobile unmanned patrol robot and a remote control system in environment such as a prison which surveillance is required.

Particularly, the present invention may maximize efficiency of preventing the correctional accident through real-time analysis of prisoners' behavioral pattern and may relieve work overload and stress of a prison officer by supporting patrol work through unmanned correctional surveillance robot, and a 21st century future correctional facilities into which the latest IT technologies and correctional work are fused may be built.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Figure 1:
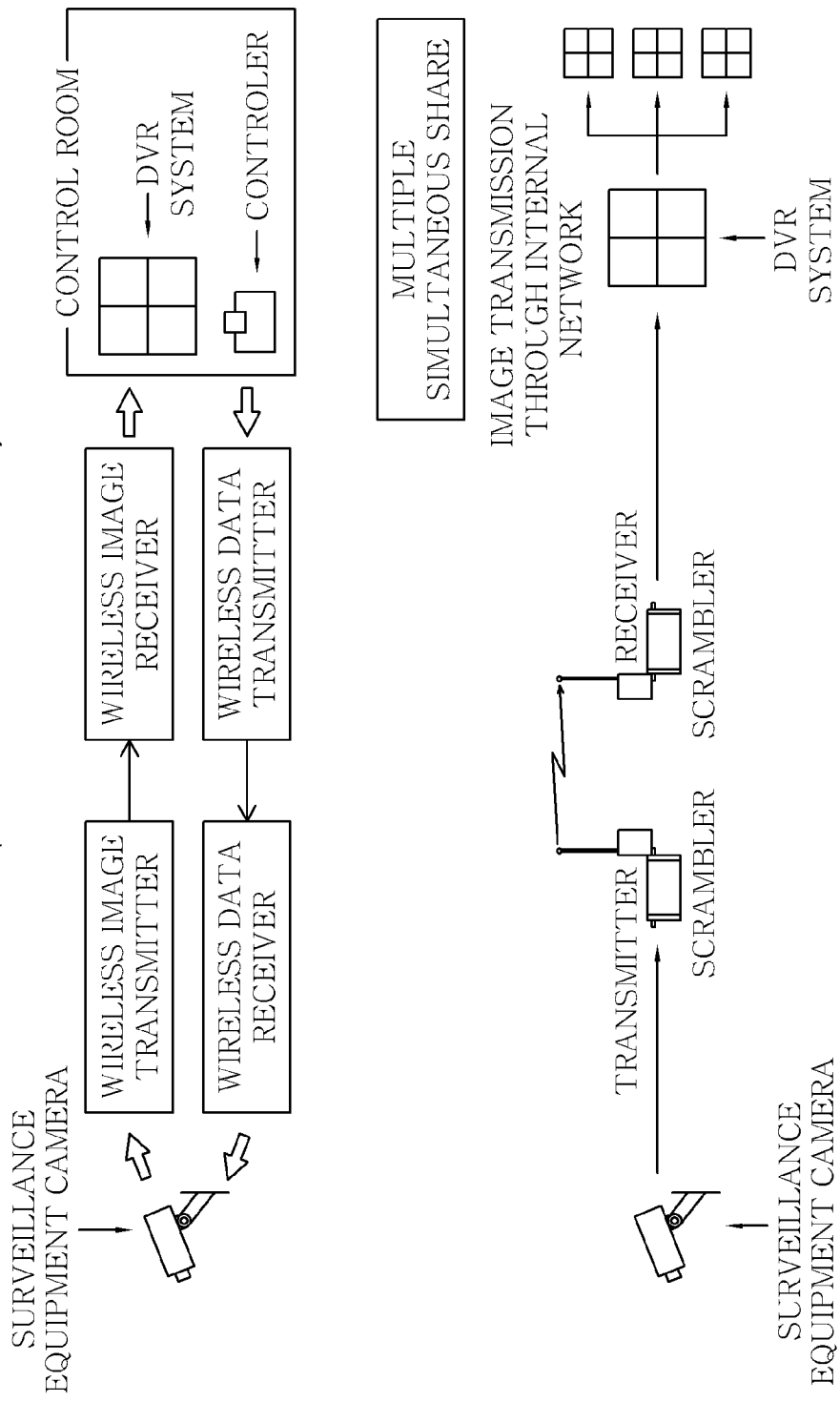
FIG. 1 is a schematic diagram showing a conventional unmanned surveillance apparatus.

Embodiments of the present invention will be described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Combinations of each step in respective blocks of block diagrams and a sequence diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create devices for performing functions described in the respective blocks of the block diagrams or in the respective steps of the sequence diagram.

Since the computer program instructions, in order to implement functions in specific manner, may be stored in a memory useable or readable by a computer aiming for a computer or other programmable data processing apparatus, the instruction stored in the memory useable or readable by a computer may produce manufacturing items including an instruction device for performing functions described in the respective blocks of the block diagrams and in the respective steps of the sequence diagram. Since the computer program instructions may be loaded in a computer or other programmable data processing apparatus, instructions, a series of processing steps of which is executed in a computer or other programmable data processing apparatus to create processes executed by a computer so as to operate a computer or other programmable data processing apparatus, may provide steps for executing functions described in the respective blocks of the block diagrams and the respective sequences of the sequence diagram.

Moreover, the respective blocks or the respective sequences may indicate modules, segments, or some of codes including at least one executable instruction for executing a specific logical function(s). In several alternative embodiments, is noticed that functions described in the blocks or the sequences may run out of order. For example, two successive blocks and sequences may be substantially executed simultaneously or often in reverse order according to corresponding functions. Hereinafter, embodiments of the present invention will be described in detail with reference to the accompanying drawings which form a part hereof.

Prior to the description of the embodiment of the present invention, the present invention may include mobile unmanned patrol robot autonomously for detecting abnormal behavior patterns of prisoners, and remote control system for supporting for a prison officer working in a remote control room to early detect incents and accidents.

The mobile unmanned patrol robot may provide driving in remote/autonomous mode within a standardized area, and informing a remote control system whether abnormality exists through wireless network if the abnormal behavior patterns of the prisoners are detected and incidents and accidents are occurred.

The remote control system may provide the prison officer in the remote control room with a monitoring function capable of quickly detecting incidents and accidents in a prison on the basis of processing robot operation information and video information in real time to operate remotely a number of mobile unmanned patrol robots on the basis of wireless networks.

Accordingly, the present invention may include a correctional support robot platform and system application technology, which is capable of preventing or early detecting correctional accidents such as suicide, assault, arson, vandalism and the like using the mobile unmanned patrol robot and a remote control system in environment such as a prison which surveillance is required, and the purpose of the present invention may be easily achieved by the above technology.

Hereinafter, embodiments of the present invention will be described in detail with reference to the accompanying drawings which form a part hereof.

Figure 2:
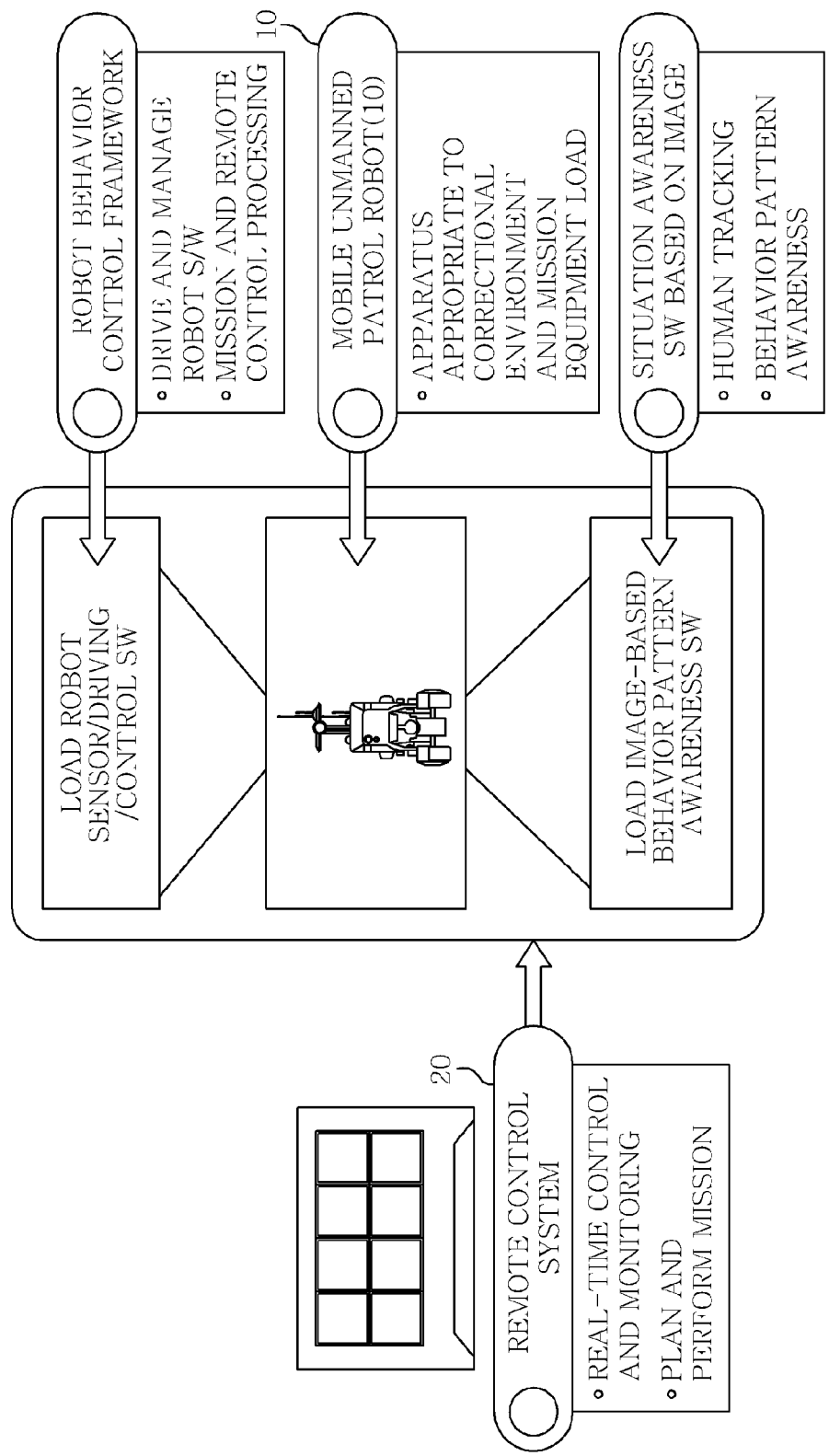
FIG. 2 is a diagram showing the configuration of an unmanned surveillance device by using a remote control system in accordance with the present invention.

FIG. 2 is a schematic diagram showing the configuration of an unmanned surveillance apparatus using a remote control system in accordance with an embodiment of the present invention, and may include a mobile unmanned patrol robot 10 and a remote control system 20 for enabling incidents and accidents to be early detected in surveillance environments.

As shown in FIG. 2, an apparatus, mission equipment, and the like which are necessary to correctional environments may be loaded in the mobile unmanned patrol robot 10, and a robot behavior control framework for driving and managing robot software, mission performance and remote control processing may be loaded. Further, an image-based context awareness software for human tracking and behavior pattern recognition may be loaded in the mobile unmanned patrol robot 10.

The robot behavior control framework, software, and the like may be included in a robot control terminal which will be described later.

A plurality of this mobile unmanned patrol robot 10 may be placed within surveillance environment, e.g., the surveillance environment of the prison which may be applied in an embodiment of the present invention, and each of the mobile unmanned patrol robot 10 may employ a wheel structure suitable for the surveillance environment of the prison.

Figures 3A, 3B:
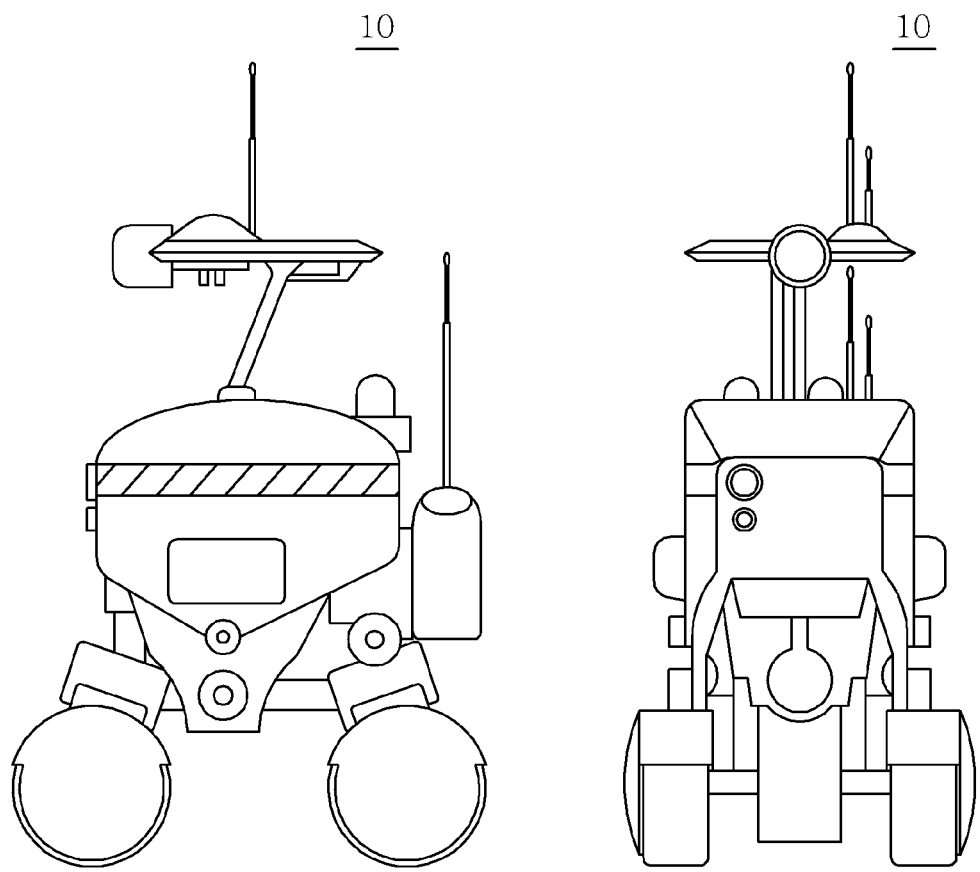
FIGS. 3A and 3B are a side view and a front view showing an example of a robot for unmanned surveillance (mobile unmanned patrol robot) respectively in accordance with the present invention.

FIGS. 3A and 3B are a side view and a front view showing an example of the mobile unmanned patrol robot 10, respectively.

As shown in FIGS. 3A and 3B, the mobile unmanned patrol robot 10 may load a camera for photographing a room of the prisoners on the front of the top thereof in the surveillance environment of the prison, and a part which the camera is loaded may be adjusted back-and-forth and up-and-down.

The remote control system 20 may perform real-time control and monitoring of the mobile unmanned patrol robot 10, and may plan a mission of the mobile unmanned patrol robot 10 and command to perform the mission.

Figure 4:
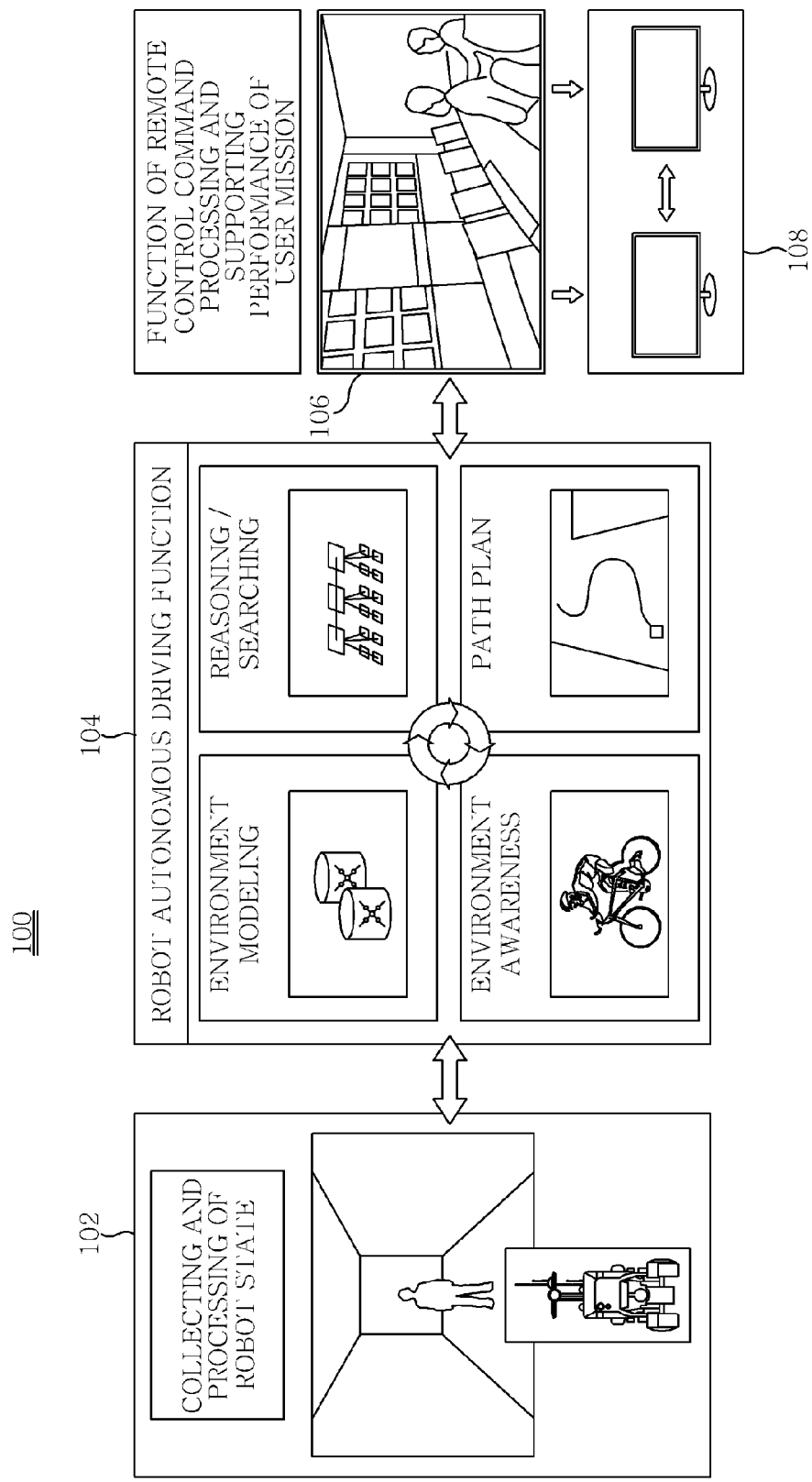
FIG. 4 is a block diagram showing a robot control terminal capable of being loaded in a robot for unmanned surveillance in accordance with the present invention.

FIG. 4 is a configuration block diagram showing a robot control terminal 100 which may be loaded in the mobile unmanned patrol robot 10 for unmanned surveillance in accordance with the present invention. The robot control terminal 100 may include a robot state information processing unit 102, a robot autonomous driving unit 104, a remote control command processor 106, a user mission performance support unit 108 and the like.

As shown in FIG. 4, the robot state information processing unit 102 may perform creating a space infrastructure for driving of the mobile unmanned patrol robot 10, and may collect state information of the mobile unmanned patrol robot 10. Further, the robot state information processing unit 102 may process the collected state information to share the processed state information with the robot autonomous driving unit 104.

The robot autonomous driving unit 104 may provide a location-awareness function for autonomous driving of the mobile unmanned patrol robot 10, a function of planning an optimal path for autonomous driving of the mobile unmanned patrol robot 10 according to the result of state information processing which is processed by the robot state information processing unit 102. In addition, the robot autonomous driving unit 104 may include a function of reasoning and searching, a function of modeling and awareness of an environment and the like for autonomous driving of the mobile unmanned patrol robot 10.

The remote control command processor 106 is connected with the robot autonomous driving unit 104 and may include a function of processing surveillance information, a function of behavior control processing and the like for remote control of the mobile unmanned patrol robot 10.

The user mission performance support unit 108 is connected with the remote control command processor 106 and may include a function of processing visual information for user remote control, a function of transmitting situation awareness sensor information of the mobile unmanned patrol robot 10 to an operator and the like.

Figure 5:
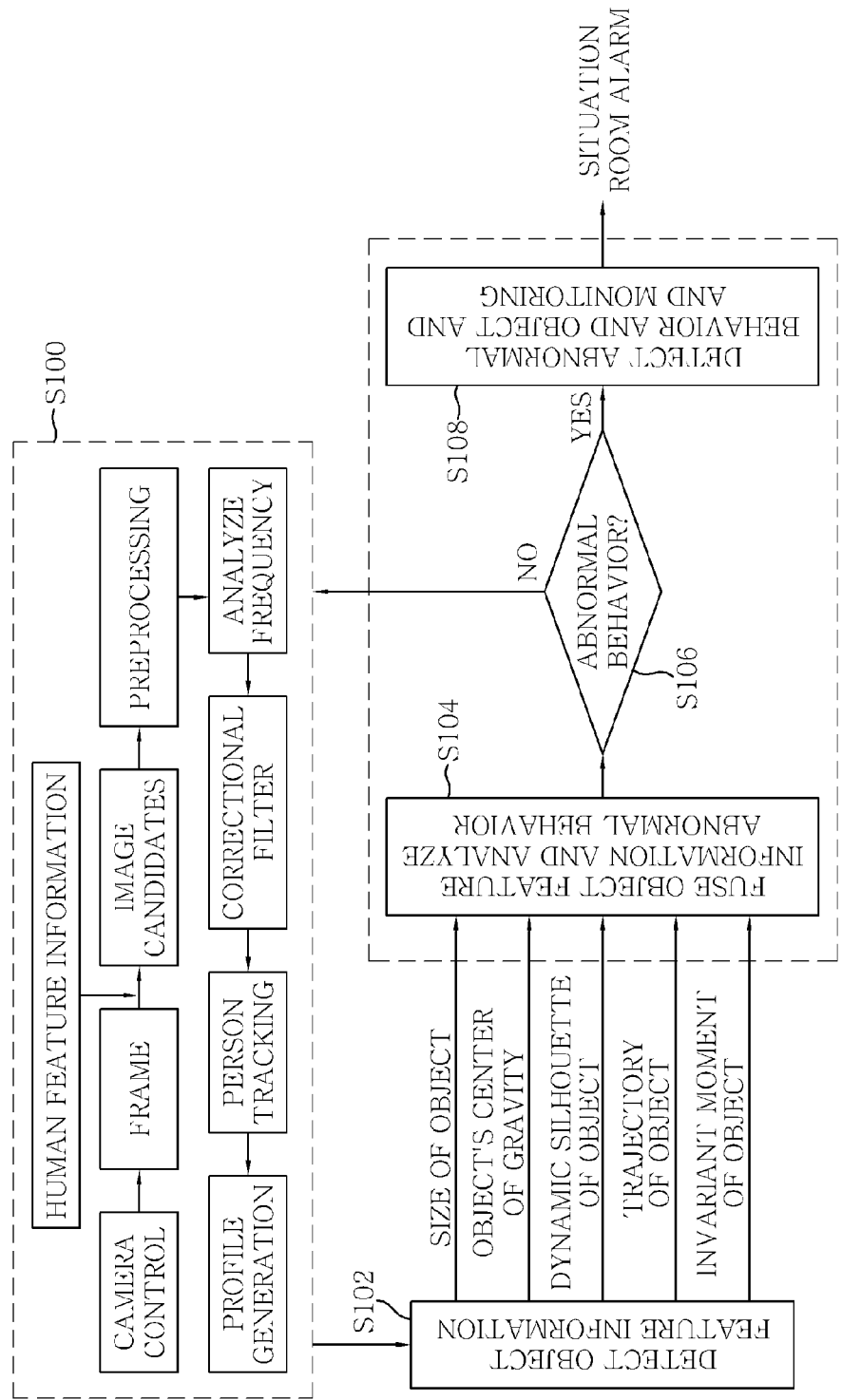
FIG. 5 is a flow chart showing a method for unmanned surveillance by using a remote control system.

FIG. 5 is a flow chart showing a method for unmanned surveillance using a remote control system, specifically, procedure of providing the unmanned surveillance of the robot control terminal 100 loaded in the mobile unmanned patrol robot 10.

As shown in FIG. 5, the method for providing the unmanned surveillance of the robot control terminal 100 may include adaptive tracking an object based on human context in step S100; detecting the object based on fusion of features in step S102; analyzing and perceiving an abnormal situation context in step S104; determining whether abnormal behavior occurs in step S106; controlling an three-dimensional camera for extraction of geometric object information in step S100 if it has been determined that the abnormal behavior has not occurred in step S106; and alarming and monitoring an abnormal situation in step S108 if it has been determined that the abnormal behavior has occurred in step S106.

The adaptive tracking an object based on human context in step S102 may include tracking the object based on complex features (e.g. correction filter, color, context, and edge), and modeling backgrounds based on entropy for change of a background such as lighting and the like.

The detecting an object based on fusion of features in step S102 may include modeling and matching based on this complex features, segmentation based on adaptive morphology and the like.

The controlling a three-dimensional camera for extracting geometric object information in step S100 may include managing three-dimensional multi-object profile, extracting three-dimensional feature f—or extraction of geometric information and the like.

The analyzing and perceiving an abnormal situation context in step S104 may include fusing and analyzing a statistics-based prediction model for dynamic emergency events modeling and multiple objects feature information, and perceiving abnormal behavior context.

Figure 6:
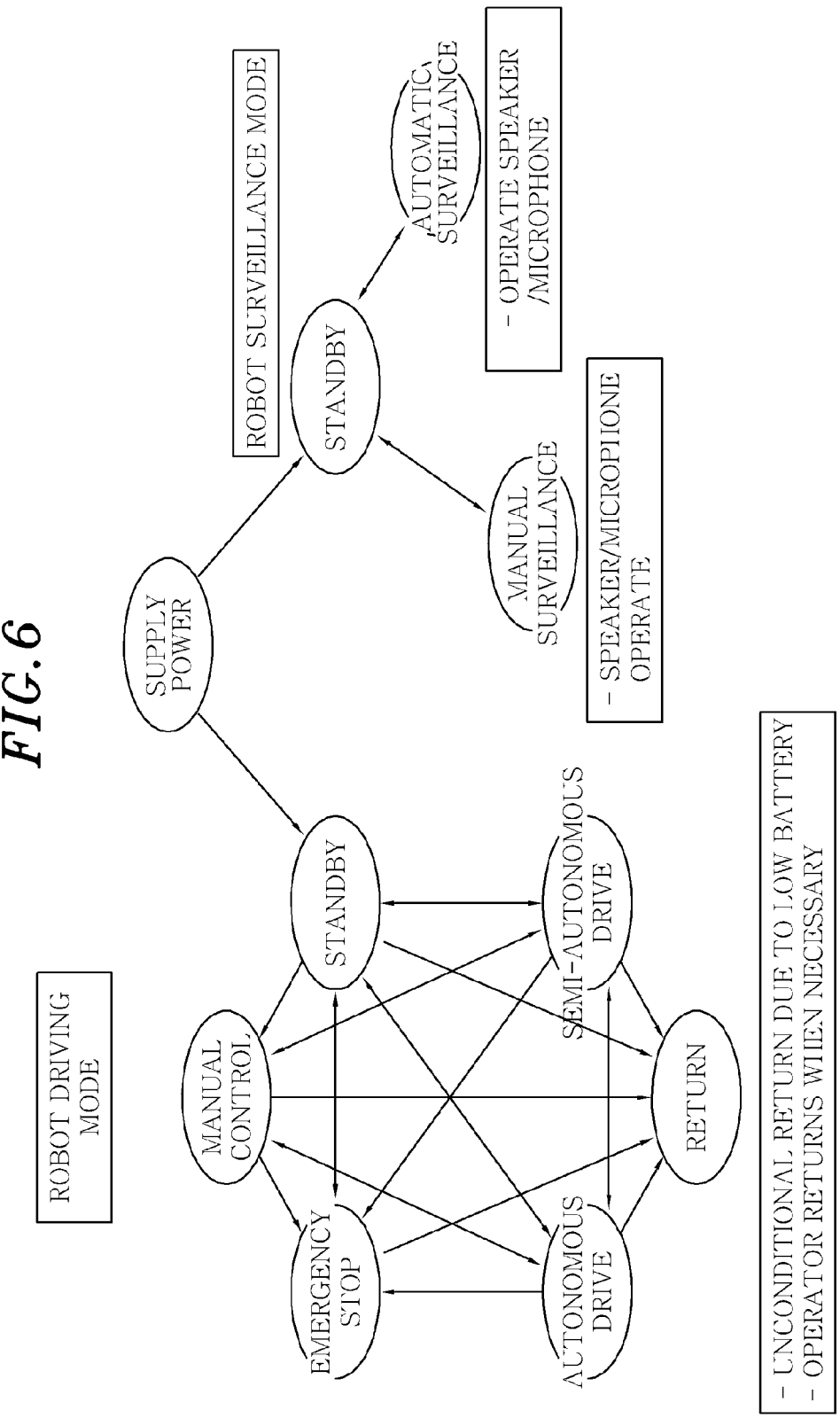
FIG. 6 is a conceptual diagram showing an operation mode of a prison surveillance system to which an unmanned surveillance device may be applied in accordance with the present invention.

FIG. 6 is a conceptual diagram showing a system to which an unmanned surveillance device may be applied in accordance with an embodiment of the present invention, e.g., an operation mode of a prison surveillance system.

As shown in FIG. 6, the operation mode may include a driving mode and a surveillance mode, and the driving mode may include motions such as standby, semi-autonomous driving, autonomous driving, return, manual control, emergency stop and the like.

Figure 7:
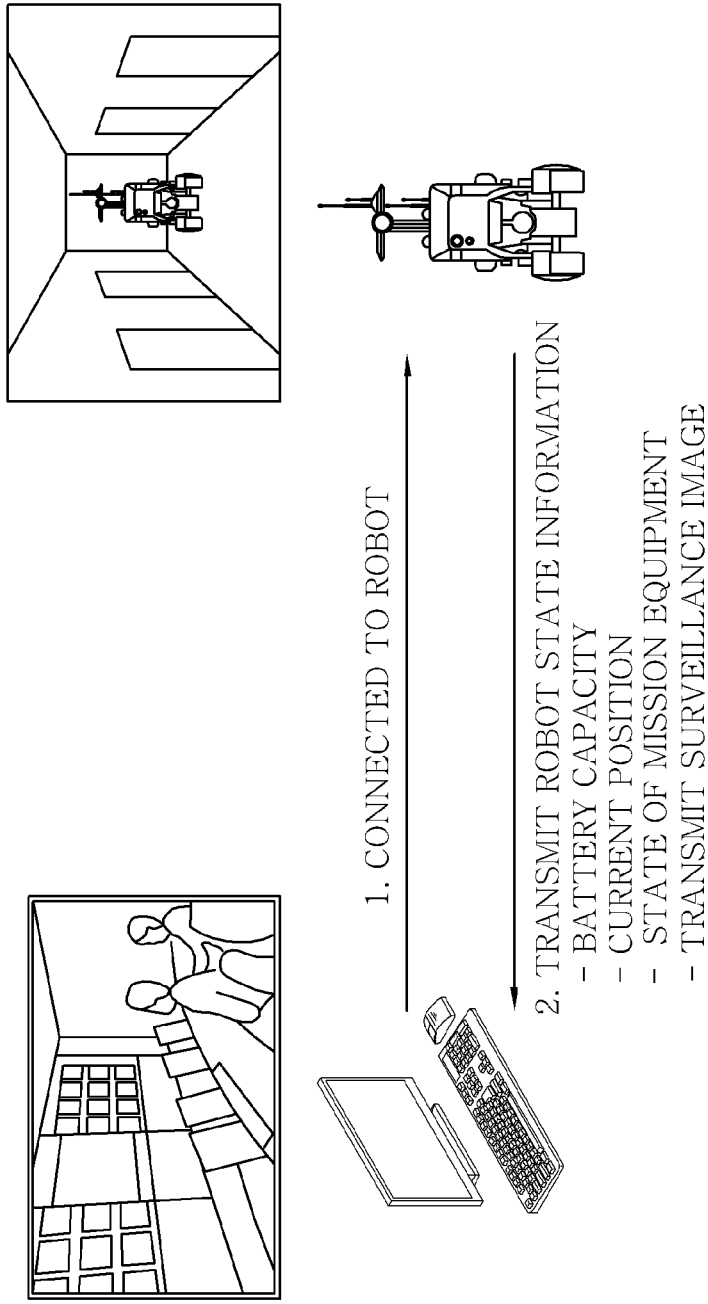
FIG. 7 is a conceptual diagram showing an initial connection procedure of a robot control terminal for unmanned surveillance in accordance with an embodiment of the present invention.

FIG. 7 is a conceptual diagram showing an initial connection procedure of a robot control terminal for the unmanned surveillance in accordance with the embodiment of the present invention, and the 'standby' represents a mode in which a mobility equipment may be operated after power is supplied.

If the robot control terminal 100 is initially connected, robot state information may be transmitted to the remote control system. Here, the robot state information may include, e.g., battery capacity, a current location, a state of mission equipment, surveillance image and the like.

Figure 8:
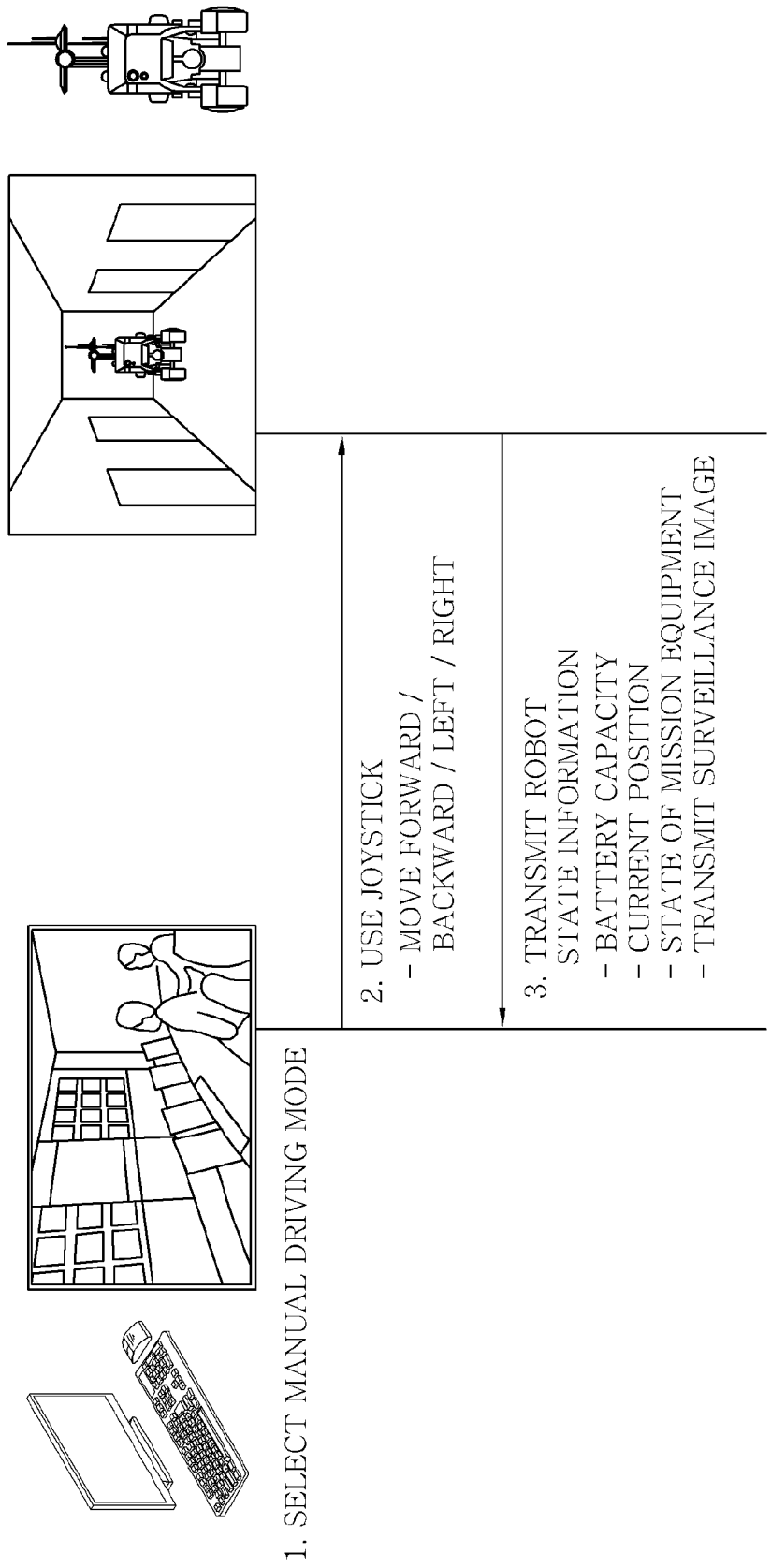
FIG. 8 is a conceptual diagram showing a manual driving mode of a robot control terminal for unmanned surveillance in accordance with an embodiment of the present invention.

FIG. 8 is a diagram showing a manual driving mode of the robot control terminal for the unmanned surveillance in accordance with the embodiment of the present invention As shown in FIG. 8, the manual driving mode may mean a mode which may operate a robot forward/backward/left/right by using a joystick.

Figure 9:
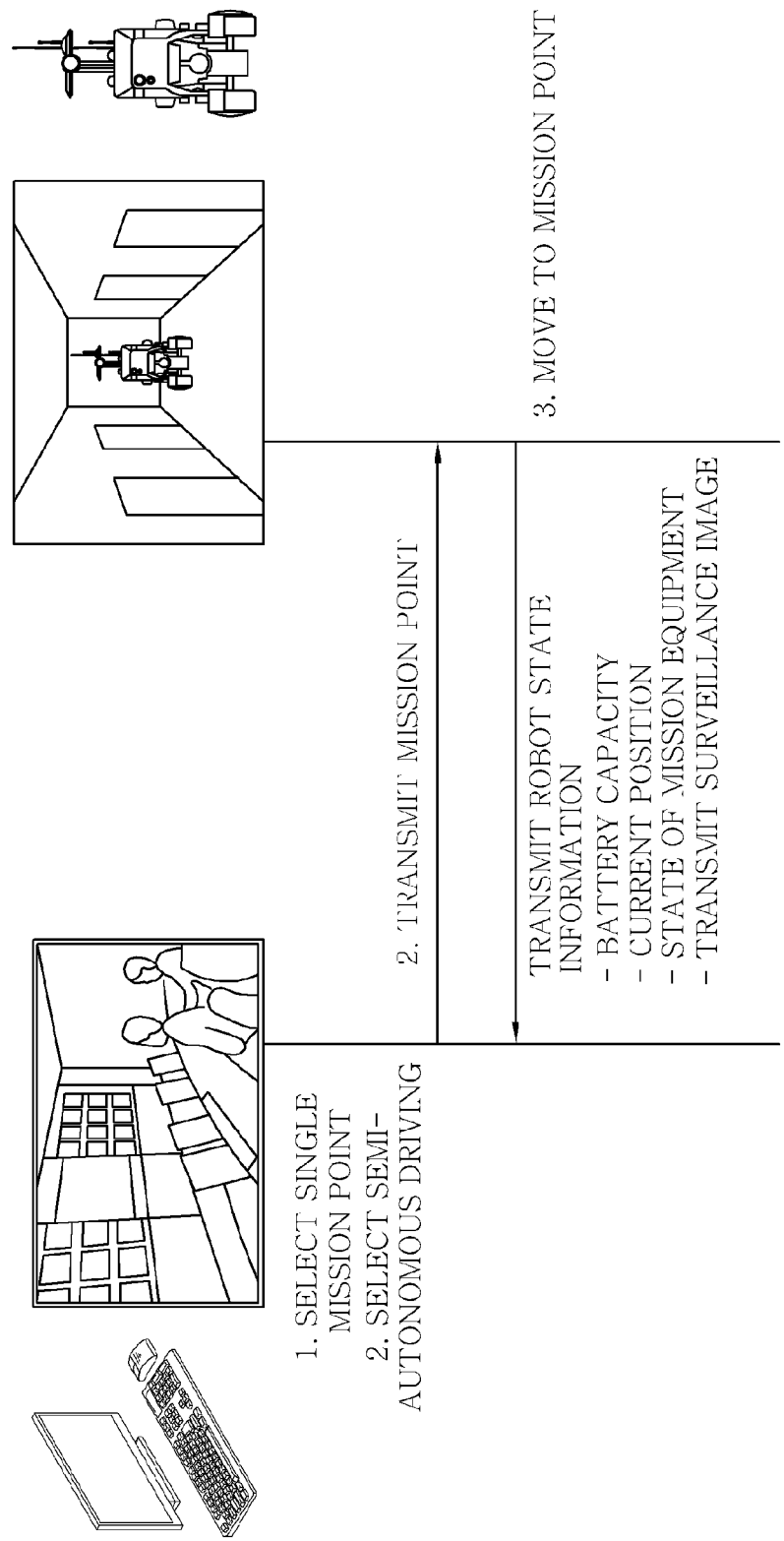
FIG. 9 is a conceptual diagram showing a moving mode procedure about a specific mission point of a robot control terminal for unmanned surveillance in accordance with an embodiment of the present invention.

FIG. 9 is a diagram showing a moving mode procedure about a specific mission point of the robot control terminal for the unmanned surveillance in accordance with the embodiment of the present invention.

As shown in FIG. 9, a semi-autonomous driving represents a mode in which the robot is moved by designating a specific mission point.

Figure 10:
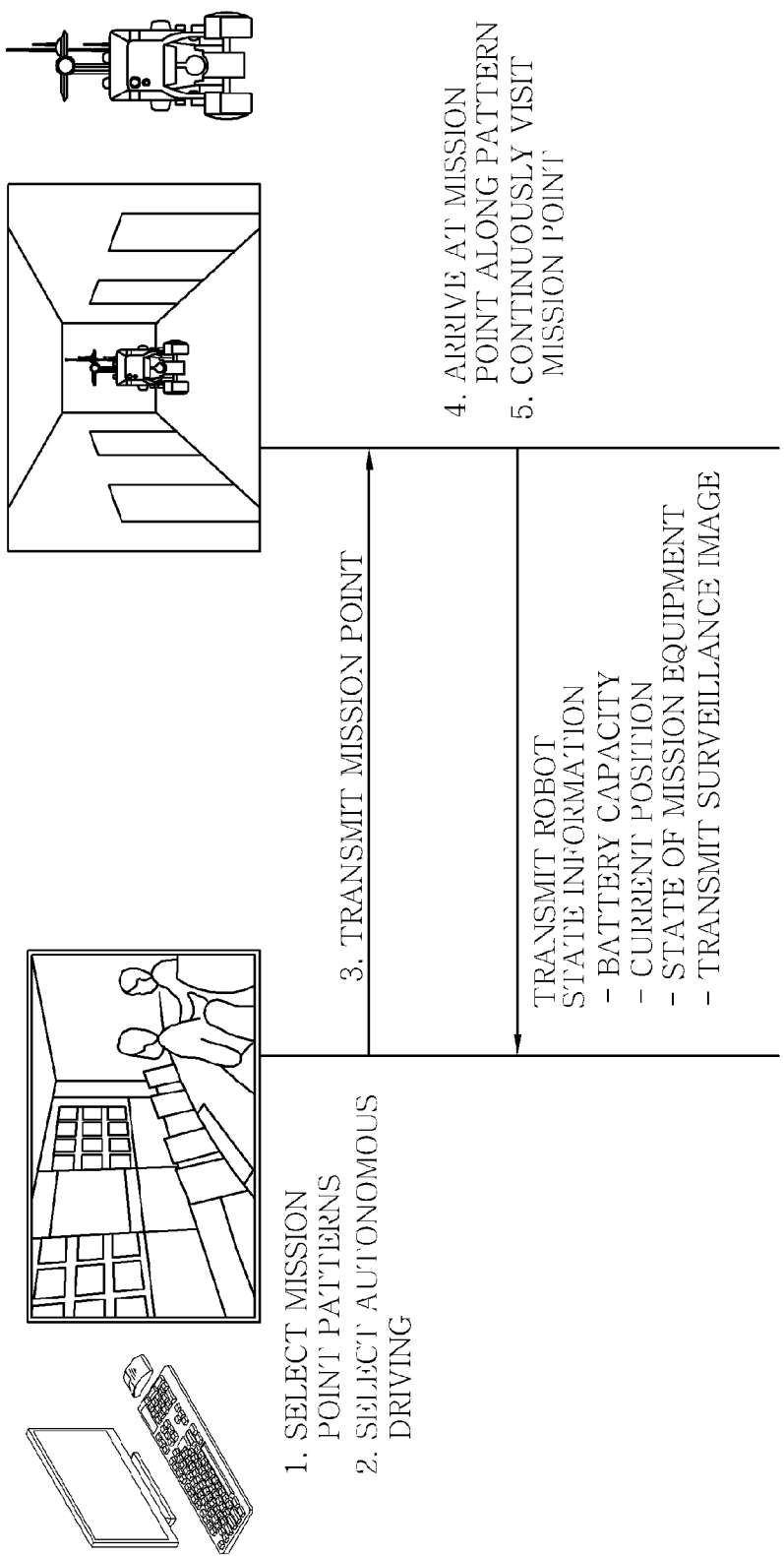
FIG. 10 is a conceptual diagram showing the moving mode procedure about a pattern of a mission point of the robot control terminal for the unmanned surveillance in accordance with the embodiment of the present invention.

FIG. 10 is a diagram showing a moving mode procedure about a pattern of a mission point of the robot control terminal for the unmanned surveillance in accordance with the embodiment of the present invention.

As shown in FIG. 10, autonomous driving represents a driving mode that if moving pattern of the mission point is given, the robot may move autonomously along a series of the mission point.

Figure 11:
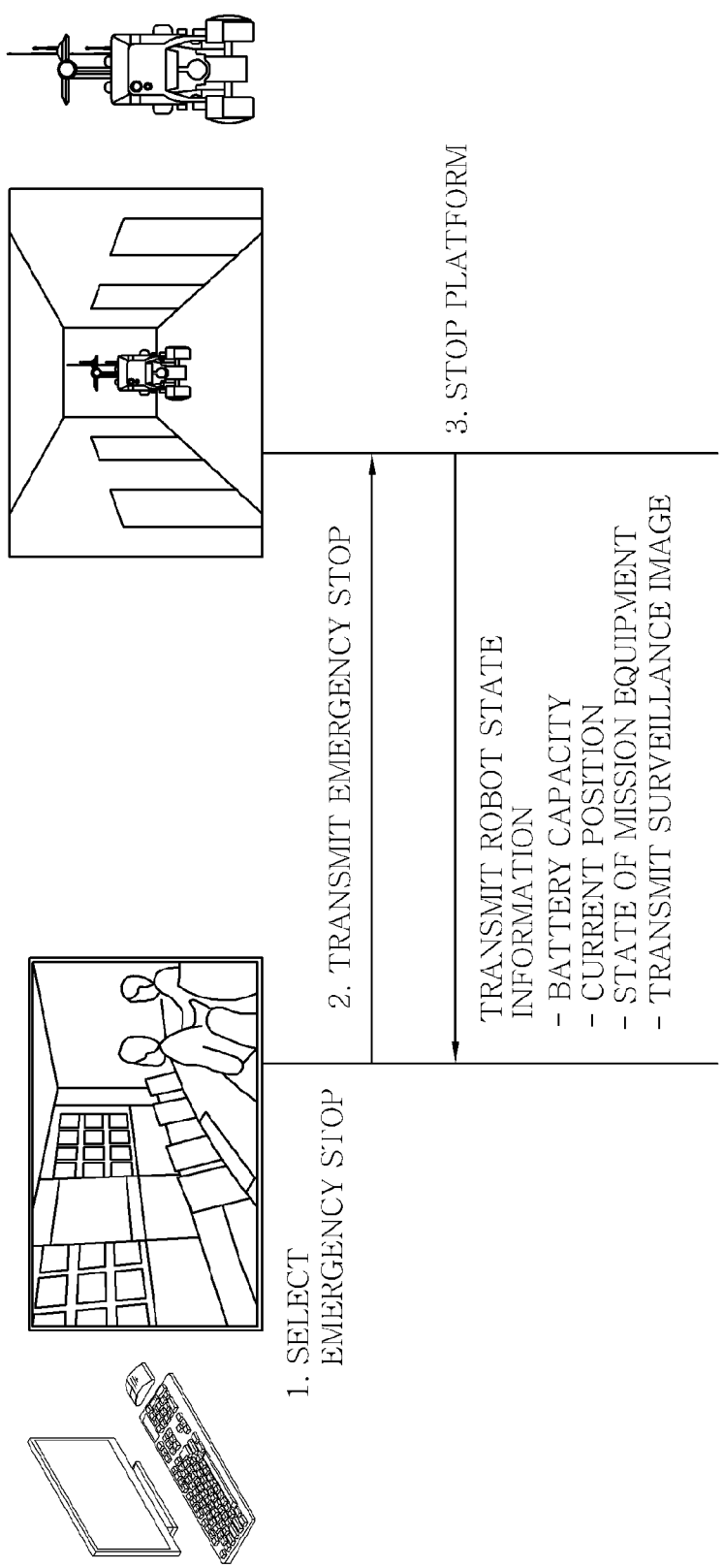
FIG. 11 is a conceptual diagram showing an emergency stop mode procedure of a robot control terminal for unmanned surveillance in accordance with an embodiment of the present invention.

FIG. 11 is a diagram showing an emergency stop mode procedure of the robot control terminal for the unmanned surveillance in accordance with the embodiment of the present invention.

As shown in FIG. 11, the emergency stop mode is a mode which is operated when the robot needs to be quickly stopped, and when an emergency stop transmission command is transmitted from the remote control system to the robot control terminal, the robot may be operated in the emergency stop mode.

Figure 12:
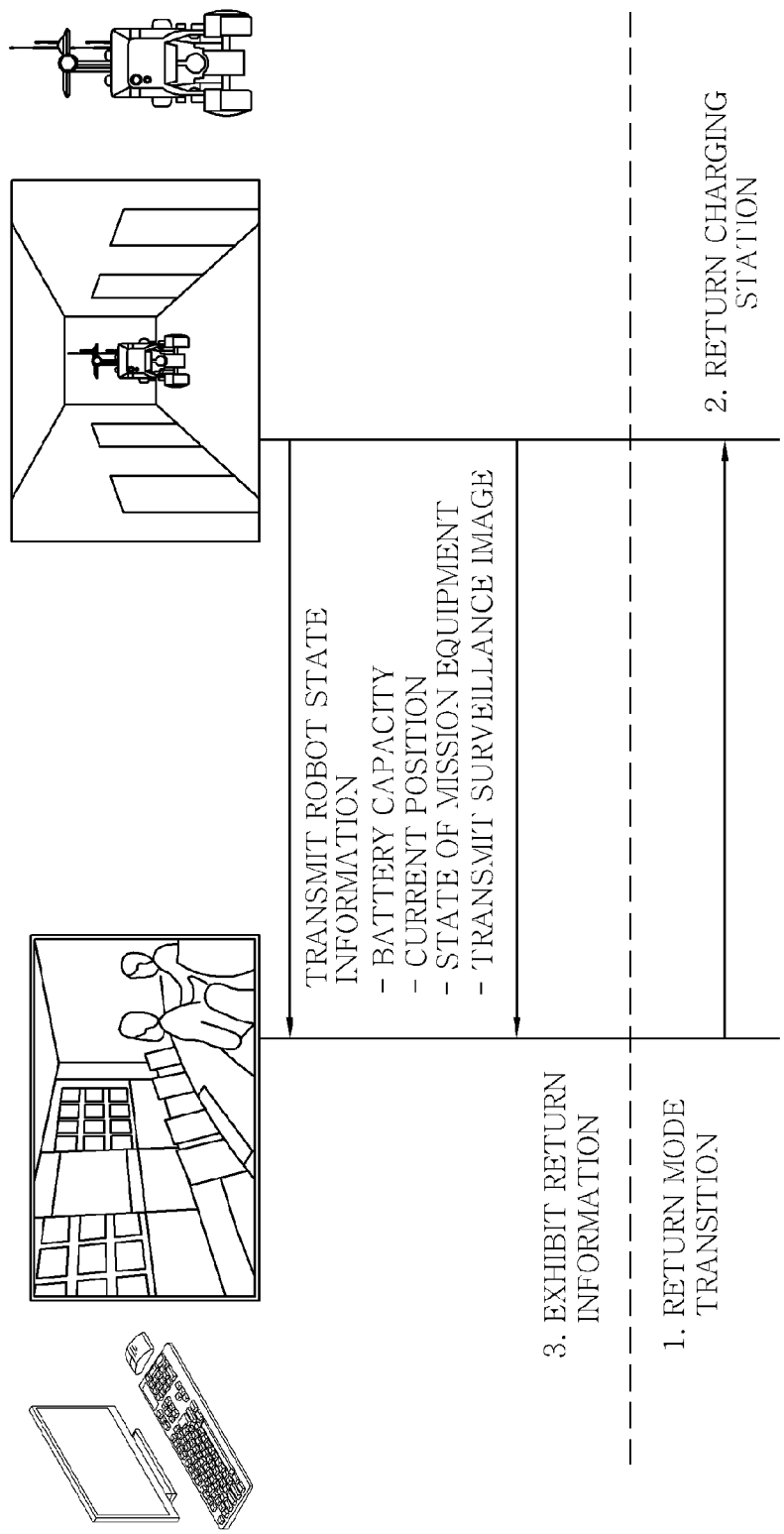
FIG. 12 is a conceptual diagram showing a return mode procedure of a robot control terminal for unmanned surveillance in accordance with an embodiment of the present invention.

FIG. 12 is a diagram showing a return mode procedure of the robot control terminal for the unmanned surveillance in accordance with an embodiment of the present invention.

As shown in FIG. 12, the return mode represents a mode commanding to move to a station for charging if amount of a battery of the robot falls below a certain level.

A surveillance mode may include standby, automatic surveillance, manual surveillance, and the like. Here, the 'standby' represents a mode in which the surveillance equipment may be operated after power is supplied.

Figure 13:
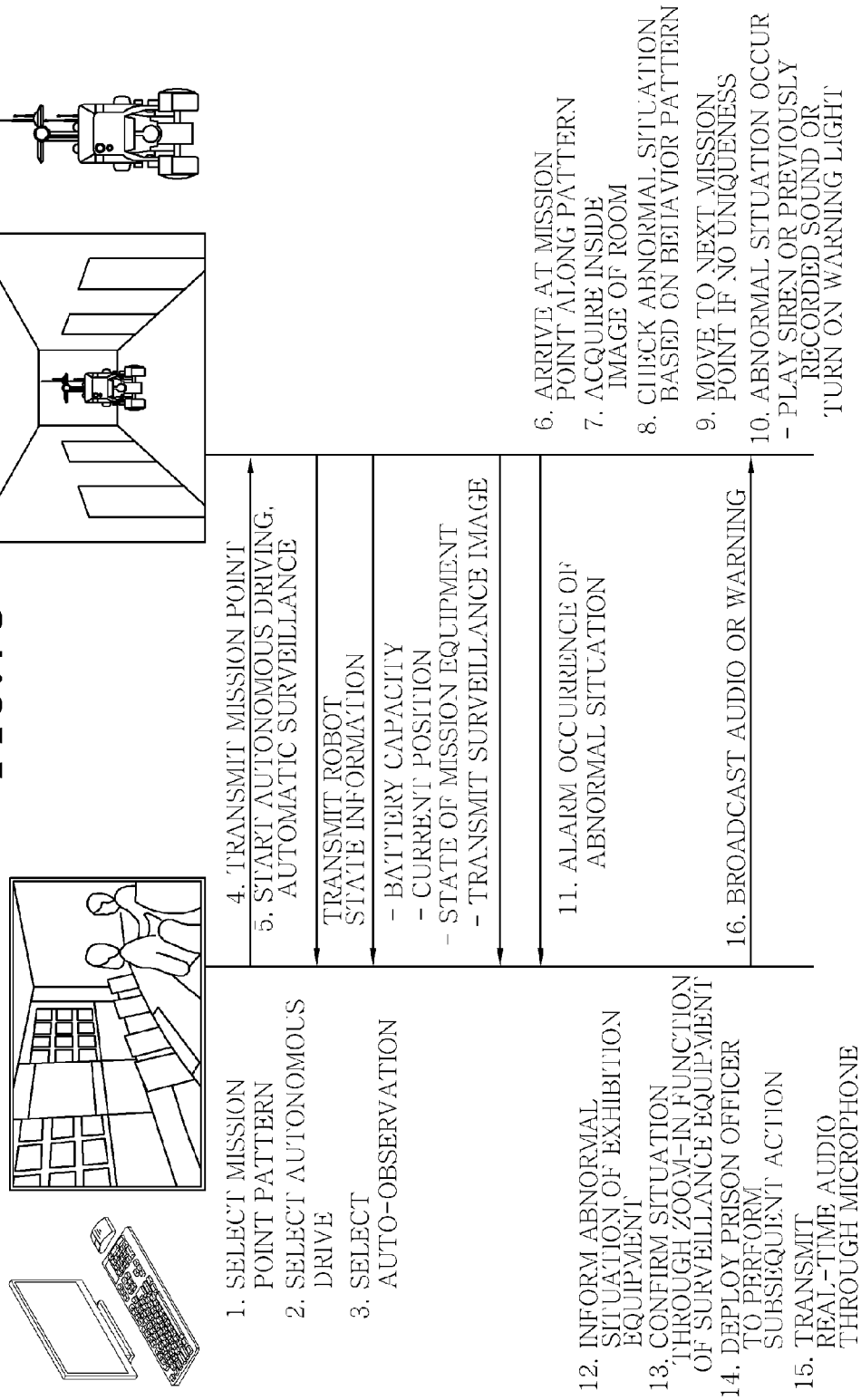
FIG. 13 is a conceptual diagram showing a warning mode procedure of a robot control terminal for unmanned surveillance in accordance with an embodiment of the present invention.

FIG. 13 is a diagram showing a warning mode procedure of the robot control terminal for the unmanned surveillance in accordance with the embodiment of the present invention.

As shown in FIG. 13, a warning mode represents a mode which perceives an abnormal behavior pattern of prisoners based on an acquired image, determining and warning.

For example, a robot may arrive at a mission point along patterns and acquire an inside image of a room, may check whether abnormal situations based on a behavior pattern occur. If the abnormal situations occur as a result of the check, the robot may make alarm to notify the occurrence of the abnormal situations.

Notification information corresponding to the abnormal situation occurrence alarm may be provided to the remote control system. Accordingly, an operator of the remote control system may inform the abnormal situations of exhibition equipment, and may confirm the situation through a zoom-in operation of the surveillance equipment.

Figure 14:
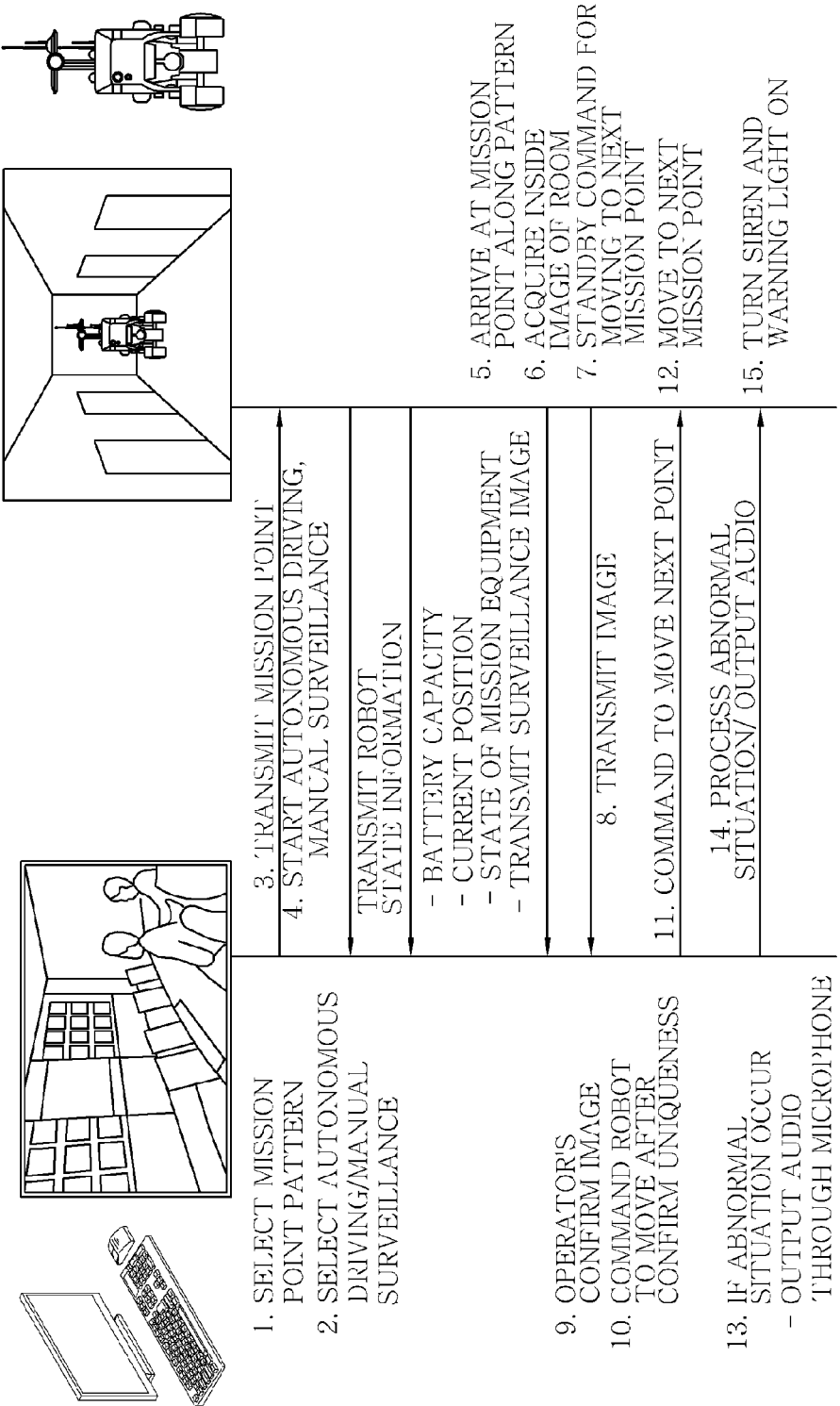
FIG. 14 is a conceptual diagram showing an entire operation procedure of a robot control terminal for unmanned surveillance in accordance with an embodiment of the present invention.

FIG. 14 is a diagram showing an entire operation procedure of the robot control terminal for the unmanned surveillance in accordance with the embodiment of the present invention.

As shown in FIG. 14, in a manual surveillance mode, an operator may operate surveillance equipment by using a joystick, may acquire an image, and may determine.

Figure 15:
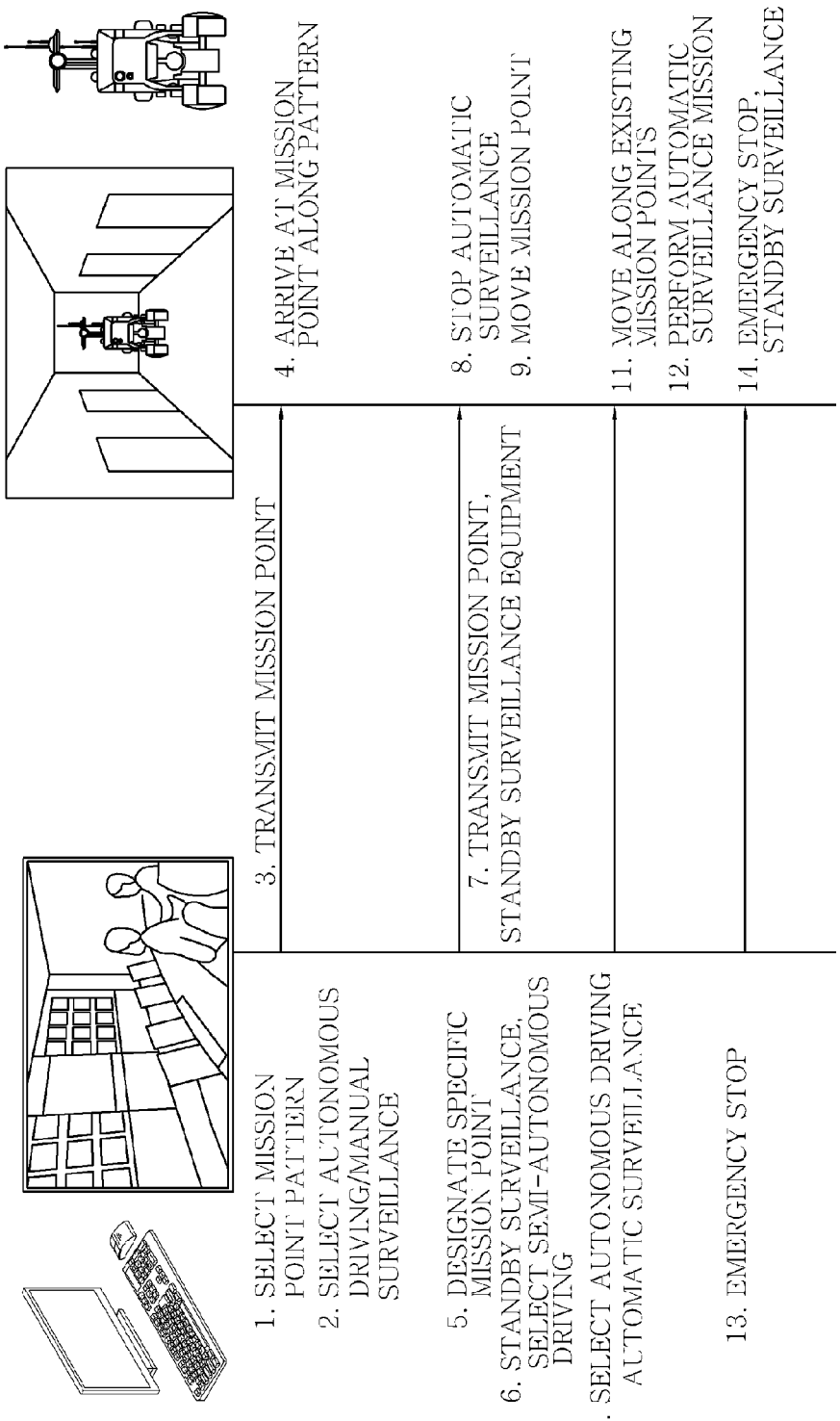
FIG. 15 is a conceptual diagram showing a transition mode procedure of a robot control terminal for unmanned surveillance in accordance with an embodiment of the present invention.
Figure 16A:
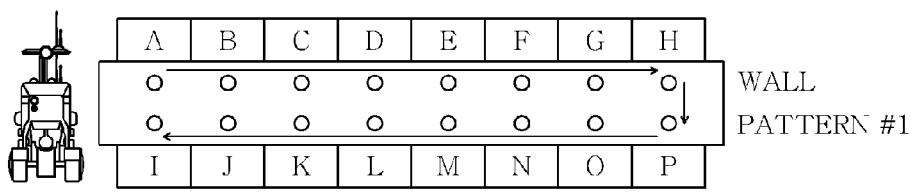
FIGS. 16A to 16D are conceptual diagrams illustratively showing autonomous driving based on a mission point pattern in FIG. 10 in accordance with an embodiment of the present invention.
Figure 16B:
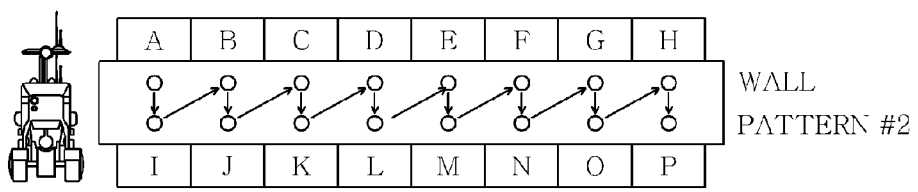
Figure 16C:
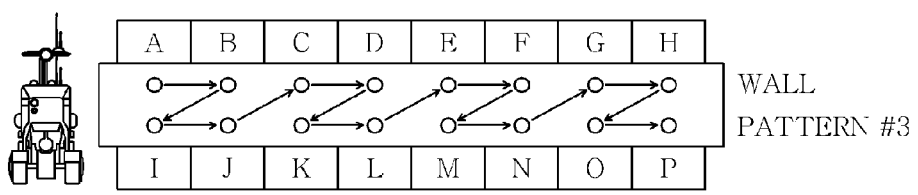
Figure 16D:
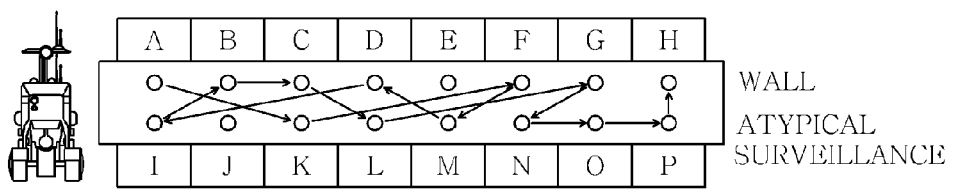

FIG. 15 is a diagram showing a mode transition procedure of the robot control terminal for the unmanned surveillance in accordance with the embodiment of the present invention.

FIGS. 16A to 16D are example diagrams showing autonomous driving based on the mission point pattern in accordance with the embodiment of the present invention.

In accordance with the present invention, correctional accidents such as suicide, assault, arson, vandalism, and the like may be prevented or early detected by multi-monitoring various states in surveillance environments by using a mobile unmanned patrol robot and a remote control system in environment such as a prison which surveillance is required.

Particularly, the present invention may maximize efficiency of preventing the correctional accident through real-time analysis of prisoners' behavioral pattern and may relieve work overload and stress of a prison officer by supporting patrol work through unmanned correctional surveillance robot, and a 21st century future correctional facilities into which the latest IT technologies and correctional work are fused may be built.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A robot control terminal for unmanned surveillance, comprising:
   a robot state information processor unit configured to perform a function of creating space infrastructure for driving of a robot, and collect and process the state information of the robot;
   a robot autonomous driving unit including instructions executable by a processor to provide location awareness information for autonomous driving of the robot according to a result of processing the state information processed by the robot state information processing unit, and provide an optimal path for the autonomous driving of the robot;
   a remote control command processor unit including instructions executable by a processor to process surveillance information for remote control of the robot while being connected with the robot autonomous driving unit, and process behavior control of the robot based on the remote control; and
   a user mission performance support unit including instructions executable by a processor to process image information for the remote control of a user while being connected to the remote control command processor unit, and transmit situation awareness information relating to a correctional facility situation to an operation system.

2. The robot control terminal of claim 1, wherein the robot autonomous driving unit provides a function of reasoning and searching for the autonomous driving of the robot.

3. The robot control terminal of claim 1, wherein the robot autonomous driving unit provides a function of modeling and awareness of an environment.

4. The robot control terminal of claim 1, wherein the robot control terminal includes a function of image-based context awareness.

5. An unmanned surveillance device, comprising:
   a robot control terminal configured to be loaded within a remote control robot under a surveillance environment, collect state information and surrounding circumstance information, operate the remote control robot in driving mode or surveillance mode according to a remote control command corresponding to the state information and surrounding circumstance information; and
   a remote control system configured to receive the state information and the surrounding circumstance information of the remote control robot from the robot control terminal, output a notification relating to an abnormal behavior pattern associated with a correctional environment based on the received state information and surrounding circumstance information of the remote control robot, and provide the remote control command to the robot control terminal;
   wherein the robot control terminal comprises a robot autonomous driving unit including instructions executable by a processor to perform a reasoning function responsive to the abnormal behavior pattern associated with the correctional environment.

6. The unmanned surveillance device of claim 5, wherein the driving mode includes at least one of a standby mode, a semiautonomous driving mode, an autonomous driving mode, a return mode, a manual control mode, or an emergency stop mode.

7. A method for unmanned surveillance using a remote control system, the method comprising:
   using a robot control terminal loaded in a robot under unmanned surveillance environment to adaptively track an object based on a human context;
   further using the robot control terminal to detect the object based on fusion of features after adaptively tracking the object;
   controlling a three-dimensional camera for extracting geometric object information after detecting the object based on the fusion of the features;
   analyzing and perceiving an abnormal situation context according to a result of the controlling the three dimensional camera; and
   generating an alarm regarding an abnormal situation relating to human behavior according to a result of the analyzing and perceiving the abnormal situation context;
   wherein the analyzing and perceiving the abnormal situation context comprises performing a real-time analysis of a movement pattern.

8. The method of claim 7, wherein said adaptively tracking the object includes:
   tracking the object based on complex features; and
   modeling backgrounds based on entropy for changing a background, including lighting.

9. The method of claim 7, wherein said detecting the object based on fusion of features includes:
   modeling and matching based on the complex features; and
   performing segmentation based on adaptive morphology.

10. The method of claim 7, wherein said controlling the three-dimensional camera includes:
   managing a three-dimensional multi-object profile; and
   extracting three-dimensional features for extracting geometric information.

11. The method of claim 7, wherein said analyzing and perceiving the abnormal situation context includes:
   fusing and analyzing multiple objects feature information and a statistics-based prediction model for dynamic emergency events modeling; and
   perceiving abnormal behavior context.

12. The method of claim 7, wherein the analyzing and perceiving the abnormal situation context according to the result of the controlling the three dimensional camera includes:
   arriving at a mission point inside of a room;
   performing autonomous driving inside of the room according to one of predetermined patterns;
   acquiring an inside image of the room based on the autonomous driving; and
   based on the acquired inside image, checking whether an abnormal situation exists based on a behavior pattern of at least one prisoner inside the room.

13. The method of claim 8, wherein the complex features include at least one of a correction filter, a color, a context or an edge.

* * * * *